Figure 1:
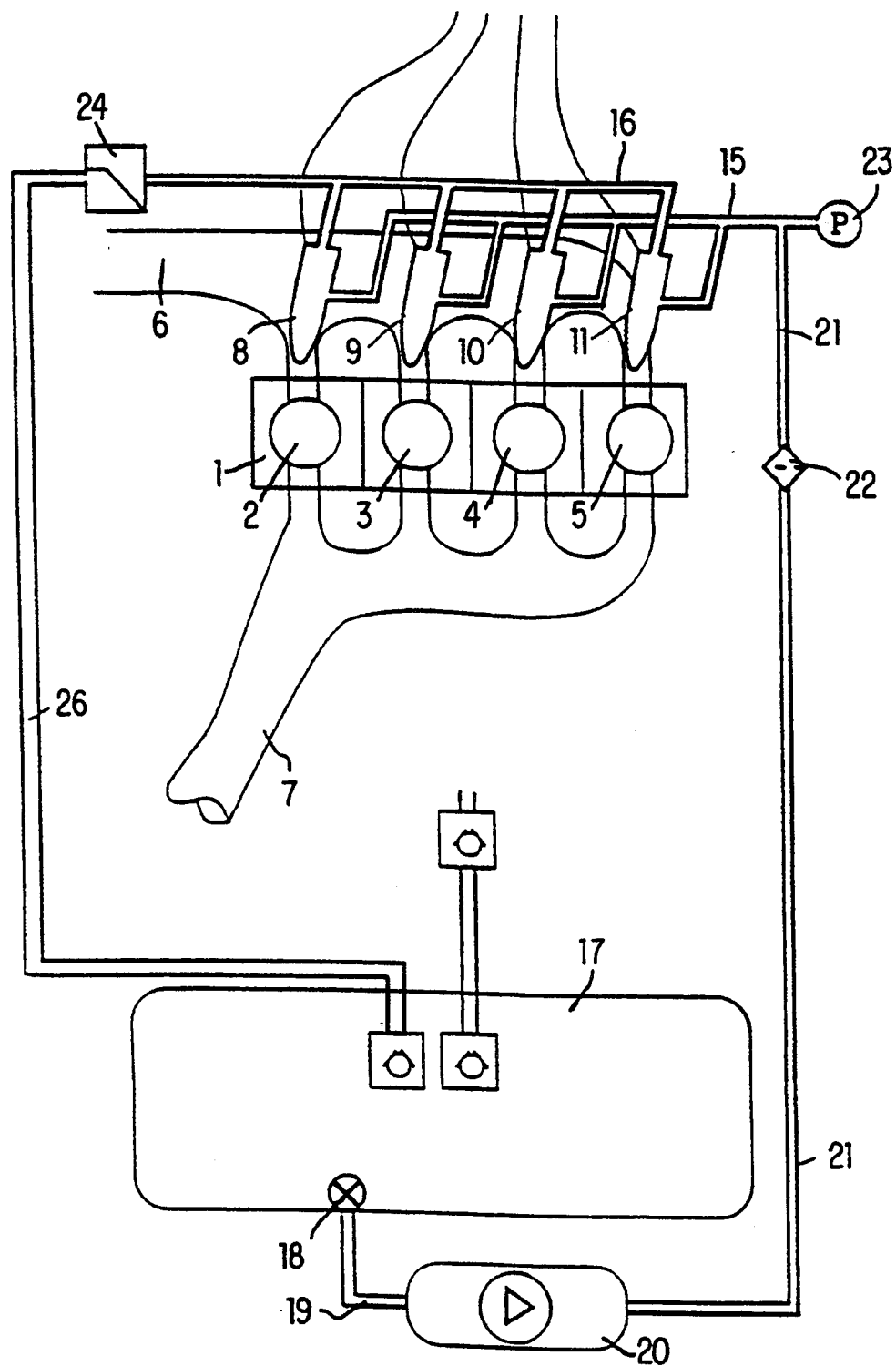

United States Patent [19]

Moore

[11] Patent Number: 5,377,645
[45] Date of Patent: Jan. 3, 1995

[54] METHOD OF FUEL INJECTION

[75] Inventor: Christopher P. Moore, Evandale, Australia

[73] Assignee: Biocom Pty. Ltd., The Levels, Australia

[21] Appl. No.: 50,464

[22] PCT Filed: Nov. 20, 1991

[86] PCT No.: PCT/AU91/00532

§ 371 Date: Jul. 9, 1993

§ 102(e) Date: Jul. 9, 1993

[87] PCT Pub. No.: WO92/08886

PCT Pub. Date: May 29, 1992

[30] Foreign Application Priority Data

Nov. 20, 1990 [AU] Australia ............. PK3410

[51] Int. Cl.$^6$ ............. F02M 21/02; F02M 37/04; F02M 51/00
[52] U.S. Cl. ............. 123/525; 123/514; 123/478
[58] Field of Search ............. 123/525, 527, 27 GE, 123/575, 514

[56] References Cited

U.S. PATENT DOCUMENTS

| | | | |
|---|---|---|---|
| 4,430,978 | 2/1984 | Lewis et al. | 123/478 |
| 4,505,249 | 3/1985 | Young | 123/527 |
| 4,508,064 | 4/1985 | Watanabe | 123/525 |
| 4,606,322 | 8/1986 | Reid et al. | 123/575 |
| 4,617,904 | 10/1986 | Pagdin | 123/525 |
| 4,632,083 | 12/1986 | Reggiani | 123/527 |
| 4,742,801 | 5/1988 | Kelgard | 123/27 GE |
| 4,774,909 | 10/1988 | Dolderer | 123/527 |
| 4,846,126 | 7/1989 | Stannard | 123/27 GE |
| 4,865,001 | 9/1989 | Jensen | 123/525 |
| 5,067,467 | 11/1991 | Hill et al. | 123/525 |
| 5,291,869 | 3/1994 | Bennett | 123/527 |
| 5,315,973 | 5/1994 | Hill et al. | 123/525 |

FOREIGN PATENT DOCUMENTS

| | | |
|---|---|---|
| 60821/80 | 1/1981 | Australia . |
| 10613/83 | 8/1983 | Australia . |
| 13225/83 | 10/1984 | Australia . |
| 59-108855 | 6/1984 | Japan ............. 123/525 |

OTHER PUBLICATIONS

Tadahiro Yamamoto, "Engine Fuel Feeder", Patent Abstracts of Japan, M-870, p. 14, JP,A,1-151760, Jun. 14, 1989 (Nissan Motor Co., Ltd.).

Primary Examiner—Raymond A. Nelli
Assistant Examiner—Thomas Morris
Attorney, Agent, or Firm—Wegner, Cantor, Mueller & Player

[57] ABSTRACT

A method of operating a low boiling point liquid fuel injection system for an internal combustion engine (1) wherein the fuel is stored in a tank (17) and has a variable vapour pressure in the tank (17) dependent upon ambient temperature. The method comprises pumping the fuel to the fuel inlet rail (15) and injectors (8, 9, 10, 11) at an absolute pressure which is maintained at a constant differential above the variable vapour pressure in the tank (17), monitoring the absolute pressure of the fuel and varying the fuel injection pulse width dependent upon the absolute pressure of the fuel together with the other usual engine parameters. The method has particular application where the fuel is a liquified gas.

11 Claims, 1 Drawing Sheet

METHOD OF FUEL INJECTION

This invention relates to a method of fuel injection and more particularly to the injection of low boiling point liquid fuels into an engine in liquid form.

As an example of a low boiling point liquid fuel Liquid Petroleum Gas is a good fuel for motor vehicles as it has a high calorific value per unit volume at high pressures and is particularly good in the liquid form as it does not require very high pressure tanks to store it. The liquid does has a relatively high vapour pressure and particularly at very high engine operating temperatures there is a danger that the LPG can vaporize and exhibit poor injection characteristics. It is desirable therefore to inject LPG into a motor vehicle engine at a pressure which ensures the LPG is in liquid form at the highest ambient temperatures but this may require a very large pump to maintain a high constant pressure because of the low vapour pressure of the LPG in cold weather. Such a large pump can be relatively heavy and have a very high power draw so that in fact it may be necessary to actually drive the LPG pump directly from the engine rather than as an electric pump.

It is the object of this invention to provide a method of injecting low boiling point liquid fuels which does not require such an energetic pump.

In one form therefore the invention is said to reside in a method of operating a low boiling point liquid fuel injection system for an internal combustion engine wherein the fuel is stored in a tank and has a vapour pressure in the tank dependant upon ambient temperature, the method comprising pumping the fuel to an operating pressure a fixed differential above the vapour pressure and monitoring the absolute pressure of the fuel and varying fuel injection timing for the fuel dependant upon the absolute pressure determined.

The absolute pressure of the fuel may be determined directly by the use of a pressure transducer or alternatively it may be determined by indirect methods such as to monitor the temperature and the density of the fuel and this will enable a determination of the absolute pressure.

In a preferred form of the invention the low boiling point liquid fuel may be Liquid Petroleum Gas (LPG) and the invention will be discussed in relation to this fuel. Petrol may also be used with the method of the invention in a closed fuel system which will prevent the release of hydrocarbons into the atmosphere.

It will be seen that by this invention there is provided an arrangement by which only a relatively small pump is required to raise the pressure of the low boiling fuel such as LPG a fixed amount above that vapour pressure thereby ensuring that the LPG will stay liquid at operational temperatures and flow rates.

In one particular example LPG may have a vapour pressure of from 300 to 1500 kilopascals dependant on ambient temperature and the differential pressure may be 200 to 300 kilopascals. This means that the absolute pressure of the LPG can range from as low as 500 kilopascals up to as high as 1800 kilopascals and hence the LPG injection timing can be varied to ensure that the correct amount of LPG is injected dependent upon that absolute pressure.

The advantage of this arrangement is that a fixed size and power output pump is needed and in fact a relatively low pressure and high flow rate pump is needed to at all times ensure that the LPG entering the injectors is in liquid form.

It is to be noted that the arrangement according to this invention could be used with a dual fuel engine so that an engine may run on a first fuel such as petrol and then be changed over to run on a second fuel such as LPG. Petrol with a relatively low vapour pressure can be operated at a fixed pressure which will always ensure that the petrol will not vaporize but as discussed above this invention proposes operating the LPG system at a fixed differential above the vapour pressure at a given time to ensure liquidity of the LPG.

For the present invention there may be used an electric fuel pump of a constant speed roller cell, gear (positive displacement) or turbine type. Such pumps deliver a constant pressure and volume of fuel which is always more than the engine needs. The operating pressure variation of the system therefore is due to the vapour pressure changes of LPG inside the tank and not solely to the discharge pressure of the pump. Therefore the pressure variation depends on the absolute pressure of the liquid in the suction side of the pump i.e. tank pressure.

In an alternative form the invention may be said to reside in fuel injection system for an internal combustion engine operating on a low boiling point liquid fuel comprising a tank for storage of liquid fuel, a pump means to raise the pressure of the fuel in fuel rail means, the fuel rail means extending to an injector or injectors for the fuel, the pump means adapted to raise the pressure of the fuel to a fixed pressure differential above the tank pressure, fuel return means extending from the injector or injectors to the tank and pressure regulation means in the fuel return means to regulate the pressure of the fuel in the fuel rail means.

As in the earlier form of the invention in a preferred form of the invention the low boiling point liquid fuel may be Liquid Petroleum Gas (LPG).

The pressure in the fuel rail may be monitored by a pressure sensor which feeds back to a control unit for the engine for adjusting the injection timing from a series of look up tables that correspond to various operating pressures. Alternatively the control unit may include a processing unit using a formula to calculate from the operating pressure and other variables.

The fuel pressure regulator may be incorporated in a non-return valve with a fixed spring of a certain cracking pressure.

It will be seen that by this invention there is provided a way of economically ensuring that LPG is maintained in a liquid state in injectors by raising the pressure only a certain amount above the vapour pressure at the ambient temperature.

In a preferred form of the invention the engine may be a dual fuel engine and may include a petrol injection system operating with the same fuel rail means and the same injector or injectors.

A preferred embodiment of the invention will now be discussed with reference to the accompanying drawing.

In the drawing FIG. 1 it will be seen that an engine 1 has cylinders 2, 3, 4 and 5.

Combustion air enters by means of inlet manifold 6 and exhaust exits through exhaust manifold 7. A low boiling point liquid fuel such as LPG is injected into each inlet manifold for each cylinder by means of injectors 8, 9, 10 and 11. A fuel rail means consists of a inlet rail 15 extending to the injectors and a outlet fuel rail 16 withdrawing fuel from each injector.

A fuel tank 17 has a fuel exit 18 and a fuel withdrawal line 19 extending to a fuel pump 20. The fuel pump 20 pumps fuel to the fuel inlet rail 15 via line 21 and filter 22. A pressure gauge 23 measures the absolute pressure of fuel in the fuel rail means and a pressure regulator 24 in the outlet fuel rail 16 allows a desired pressure differential between the tank pressure and the rail pressure to be maintained. Return line 26 extends from the pressure regulator 24 to the fuel tank 17.

The pressure of the fuel in the fuel tank 17 is determined by the vapour pressure of the fuel in the tank which in turn is determined by the ambient temperature surrounding the fuel tank. The vapour pressure may be from 300 to 1500 kilopascals. The pump 20 is of sufficient power to raise the pressure of the fuel by 200 to 300 kilopascals and hence the absolute pressure in the fuel rails may be from 500 to 1800 kilopascals. The actual timing of the injectors 8, 9, 10 and 11 can be determined by the usual engine parameters as well as the absolute pressure of fuel in the inlet rail 15 as determined by the pressure gauge 23.

I claim:

1. A method of operating a low boiling point liquid fuel injection system for an internal combustion engine wherein the fuel is stored in a tank and has a vapour pressure in the tank dependent upon ambient temperature, the method comprising pumping the fuel to an operating pressure a fixed differential above the vapour pressure and monitoring the absolute pressure of the fuel and varying fuel injection timing for the fuel dependent upon the absolute pressure determined.

2. A method as in claim 1 wherein the low boiling point liquid fuel is Liquid Petroleum Gas (LPG).

3. A method as in claim 2 wherein the differential pressure is in the range of from 200 to 400 kilopascals.

4. A method as in claim 1 wherein the monitoring of the absolute pressure of the fuel is done directly by means of a pressure transducer.

5. A method as in claim 1 wherein the monitoring of the absolute pressure of the fuel is done by means of indirect monitoring of temperature and density of the fuel.

6. A method as in claim 1, further comprising the step of returning excess fuel to the fuel tank.

7. A fuel injection system for an internal combustion engine operating on a low boiling point liquid fuel comprising a tank for storage of liquid fuel, a pump means to raise the pressure of the fuel in fuel rail means, the fuel rail means extending to an injector or injectors for the fuel, the pump means adapted to raise the pressure of the fuel to a fixed pressure differential above the tank pressure, fuel return means extending from the injector or injectors to the tank and pressure regulation means in the fuel return means to regulate the pressure of the fuel in the fuel rail means.

8. An injection system for an internal combustion engine operating on a low boiling point liquid fuel as in claim 7 wherein the low boiling point liquid fuel is liquified petroleum gas (LPG).

9. An injection system for an internal combustion engine operating on a low boiling point liquid fuel as in claim 8 wherein the pump means is adapted to raise the pressure of LPG in fuel rail means to between 200 to 300 kilopascals above the vapour pressure of the LPG.

10. An injection system for an internal combustion engine operating on a low boiling point liquid fuel as in claim 8 wherein the pump means is an electric fuel pump selected from the group consisting of a constant speed roller cell, a positive displacement gear and a turbine.

11. An injection system for an internal combustion engine operating on a low boiling point liquid fuel as in claim 8 wherein the engine is a dual fuel engine and includes a petrol injection system operating with the same fuel rail means and the same injector or injectors.

* * * * *